Dec. 1, 1964  A. W. BLACKMAN ETAL  3,158,997
TRIBRID ROCKET COMBUSTION CHAMBER
Filed May 15, 1962
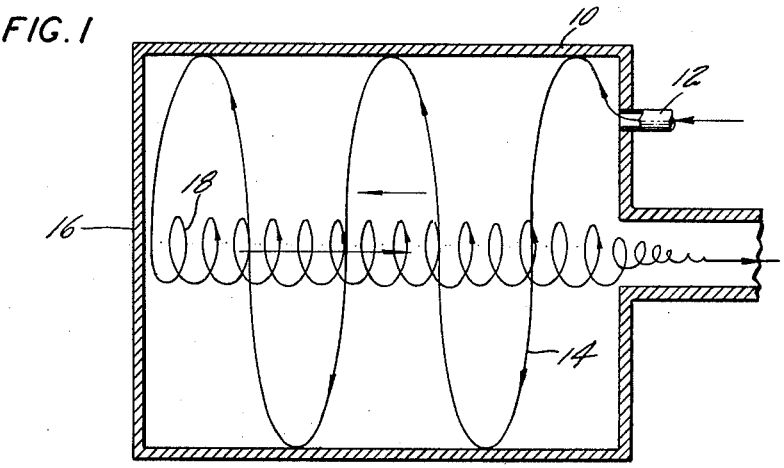
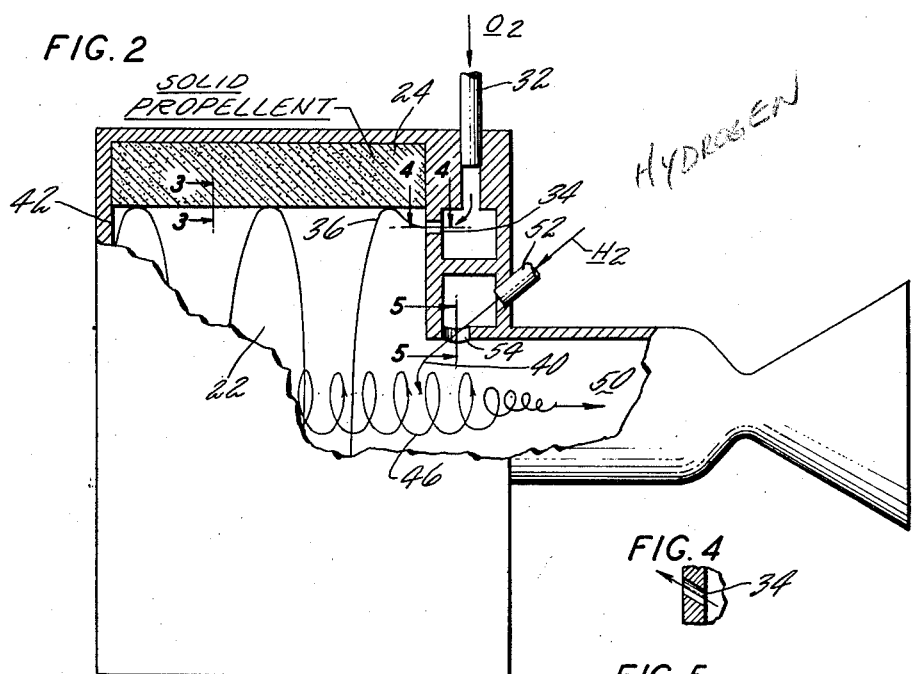
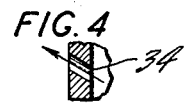
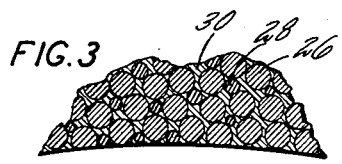
INVENTORS
ARTHUR W. BLACKMAN
JOSEPH R. KEILBACH
BY Leonard F. Wellird
ATTORNEY

United States Patent Office 3,158,997
Patented Dec. 1, 1964

3,158,997
TRIBRID ROCKET COMBUSTION CHAMBER
Arthur W. Blackman, Manchester, and Joseph R. Keilbach, Glastonbury, Conn., assignors to United Aircraft Corporation, East Hartford, Conn., a corporation of Delaware
Filed May 15, 1962, Ser. No. 194,919
7 Claims. (Cl. 60—35.6)

This invention relates to a combustion chamber for a tripropellant rocket having both solid and liquid fuels with the combustion chamber having inner and outer vortex flowpaths having the same rotational direction, but opposite axial directions.

It is well known that tripropellant systems composed of light metals and/or light metal hydrides in conjunction with hydrogen and oxygen, hydrogen and fluorine, or hydrogen and ozone, have highly attractive theoretical specific impulses and payload capabilities. Also it appears that the "tribrid" rocket concept (in which the light metal component is contained in a matrix of solid propellant binder material placed around the inner walls of the combustion chamber) offers the best approach to high combustion efficiency while circumventing the safety hazards and problems of metering and flow control associated with handling of the finely divided solid components of these propellant systems.

Review of the stoichiometric considerations for these tripropellant systems and the possible solid propellant grain configurations which are suitable to "tribrid" rocket combustion chamber applications leads to the conclusion that a definite propellant concentration profile (i.e., high oxidizer concentration at the chamber wall or grain surface) is necessary to achieve high combustion efficiency with minimum combustion chamber volume.

A "tribrid" rocket motor combustion chamber is disclosed herein which will provide high oxidizer concentrations at the grain surface and high combustion efficiency with minimum combustion chamber volume. This combustion chamber configuration employs the "double vortex" principle which can be described as two concentric vortices both spinning in the same direction but traveling in opposite axial directions within the combustion chamber as illustrated in FIG. 1. The stability of this type of flow was demonstrated experimentally by introducing a titanium tetrachloride tracer flow (which reacts with moisture in the air to form hydrogen chloride and visible particles of titanium dioxide) into an air vortex contained in a small plastic cylinder.

It is therefore an object of this invention to provide a very efficient tribrid rocket which has a relatively small combustion chamber volume and/or a short combustion chamber length.

This and other objects of this invention will become readily apparent from the following detailed description of the drawing, in which:

FIG. 1 is a diagrammatic illustration of a typical flow pattern in a combustion chamber;

FIG. 2 is a typical illustration in partial section of a rocket combustion chamber according to this invention;

FIG. 3 is a partial section along the line 3—3 of FIG. 2; and

FIGS. 4 and 5 are partial sections taken along the lines 4—4 and 5—5 of FIG. 2.

Referring to FIG. 1, a typical stream of fluid may be injected into a chamber 10 as, for example, at 12 in a tangential pattern. The fluid will first follow a vortex path such as 14 and by the time it reaches the back wall 16 the vortex flow will diminish in radius as, for example, as shown at 18 and the axis of the vortex will reverse and pass through the core of the outer vortex 14. This particular principle of flow has been known in the art and has been utilized for various reasons. However, particularly in the tribrid rocket arrangement disclosed herein, pyrolysis of the solid propellant binder occurs at the combustion walls and allows the light metal particles (originally held by the binder in the matrix illustrated in FIG. 3) to be swept into the vortex flow field. There is a reduction in the size of the particles during their stay in the combustion zone as they burn in an oxidizing atmosphere, and the particles are trapped in the outer vortex pattern until they reach a size sufficiently small to allow them to flow into the inner vortex. To this end, the reverse vortex flow pattern can provide an extremely important function during the reaction process. Thus, for example, as seen in FIG. 2, a first combustion chamber 22 is shown as having an inner peripheral cylinder 24 composed of a solid propellant. The propellant particles may be of several sizes 26, 28 (FIG. 3) and may be encased in a suitable binder 30.

As seen in FIG. 2, a suitable oxidizer may be supplied to the chamber 22 via line 32 and through either oblique nozzles or guide vanes 34. Thus the oxidizer is injected into a spiral or vortex flow 36. The oxidizer flows in contact with the solid propellant grain 24 from the nozzle end 40 of the chamber 22 toward the upstream end 42 of the combustion zone. The propellant grain seen in FIG. 3, may be composed of finely divided particles of light metal such as beryllium or a light metal hydride such as lithium hydride in a suitable thermoplastic binder matrix. The binder material pyrolizes at temperatures on the order of 600° F. and will thereby release the entrained high melting point particles from their bound position to the oxidizer vortex field. Calculations have shown that the radiant heat liberated by the metal-oxidizer reaction is ample to cause pyrolysis of the binder material once the reaction has started. Upon release to the vortex field, the propellant particles assume equilibrium orbits according to their size and density. As the particles are consumed by the oxidization process, they continue to deteriorate or reduce in size and progressively fall into smaller orbits. Toward the end of the process when the particles have decreased to a size commensurate with the desired combustion efficiency, they will automatically fall into the inner vortex 46 and are carried downstream into the hydrogen mixing chamber 50. The hydrogen is fed through line 52 through one or more oblique passages 54 at a station immediately downstream of the oxidizer injection station 34. The hydrogen vortex may be directed in opposition to that of the inner vortex 46 to provide rapid mixing in a relatively short chamber length.

It may be desirable in some instances to provide a small amount of hydrogen adjacent the oxygen passage 34 to promote ignition.

By properly sizing the particles in the solid propellant and choosing an injection velocity of the fluids into the combustion chamber, such that the residence times in the vortex correspond to the particle burning times, a highly efficient combustion chamber is provided. Furthermore, this type of arrangement provides proper oxidizer concentration profiles for the reaction between liquid or gaseous propellants and solid propellant grains which liberate finely divided solid particles when pyrolized. In addition, this invention provides long residence times required for the combustion of these particles.

As used herein, the term "double reversing vortex flow" refers to at least a pair of coaxial flow paths, each flowing in an opposite direction.

Although only one embodiment of this invention has been illustrated and described, it will be apparent that various changes and modifications may be made in the arrangement and construction of the various parts without departing from the scope of this novel concept.

What it is desired to secure by Letters Patent is:

1. A tribrid rocket including a reaction chamber, a solid propellant in said chamber, said propellant comprising a plurality of solid grain particles imbedded in a binder, means for introducing a reaction fluid into said chamber in a tangential vortex path whereby a double reversing vortex flow is formed, the reaction process in said chamber causing a liberation of said particles from the binder, the liberated particles being entrained in said path, a second reaction chamber receiving said fluid from said chamber and means for introducing a second reaction fluid into said second chamber.

2. A tribrid rocket including a reaction chamber, a solid propellant in said chamber, said propellant comprising a plurality of solid grain particles imbedded in a binder, means for introducing a first reaction fluid into said chamber in a direction whereby a double reversing vortex flow is formed, said double vortex having an outer and inner counterflowing path, the reaction process in said chamber causing a liberation of said particles from the binder, the liberated solid grain particles being entrained in said path, a second reaction chamber smaller than said first chamber and receiving said fluid from said chamber and means for introducing a second reaction fluid into said second chamber in the inner counterflow path.

3. A rocket according to claim 2 in which said first reaction fluid is an oxidizer and said second reaction fluid is a fuel.

4. A rocket according to claim 3 in which said second reaction fluid is hydrogen.

5. A tribrid power plant including an outer casing forming a chamber, a solid propellant disposed about the inner surface of said casing, a source of fluid propellant, a source of fluid oxidizer, means for conducting said fluid propellant to said chamber, and means for injecting at least one of said fluids into said chamber in a direction to form a double vortex flow in said chamber, said vortex flow comprising at least two counterflowing vortex paths, and an exhaust nozzle downstream of said chamber.

6. A tribrid power plant including an outer casing forming a chamber, a solid propellant disposed about the inner surface of said casing, said solid propellant comprising a plurality of particles of different size and a binder that pyrolizes at a predetermined temperature, a source of fluid propellant, a source of fluid oxidizer, means for conducting said fluid propellant and oxidizer to said chamber, and means for injecting at least one of said fluids into said chamber in a direction to form a double vortex flow in said chamber, said vortex flow comprising at least two concentric counterflowing vortex paths, and an exhaust nozzle downstream of said chamber.

7. A tribrid power plant including an outer casing forming a chamber, a solid propellant disposed about the inner surface of said casing, a source of fluid propellant, a source of fluid oxidizer, means for conducting said fluid oxidizer to said chamber, and means for injecting at least one of said fluids into said chamber in the region adjacent said solid propellant in a direction to form a double vortex flow in said chamber whereby the flow of combustion fluids is upstream in the outer portions of said chamber and the flow of combustion fluids is in a downstream direction in the central portion of said chamber, and a duct leading from said chamber on the downstream side thereof.

References Cited by the Examiner

UNITED STATES PATENTS

| | | | |
|---|---|---|---|
| 2,654,997 | 10/53 | Goddard | 60—35.6 |
| 2,689,452 | 9/54 | Jordan | 60—35.6 |
| 2,878,643 | 3/59 | Fox | 60—35.6 |
| 2,896,914 | 7/59 | Ryan | 60—39.69 |
| 2,935,840 | 5/60 | Schoppe | 60—39.69 |
| 3,002,340 | 10/61 | Landerman | 60—35.6 |
| 3,017,748 | 1/62 | Burnside | 60—35.6 |

SAMUEL LEVINE, *Primary Examiner.*